Patented June 4, 1929.

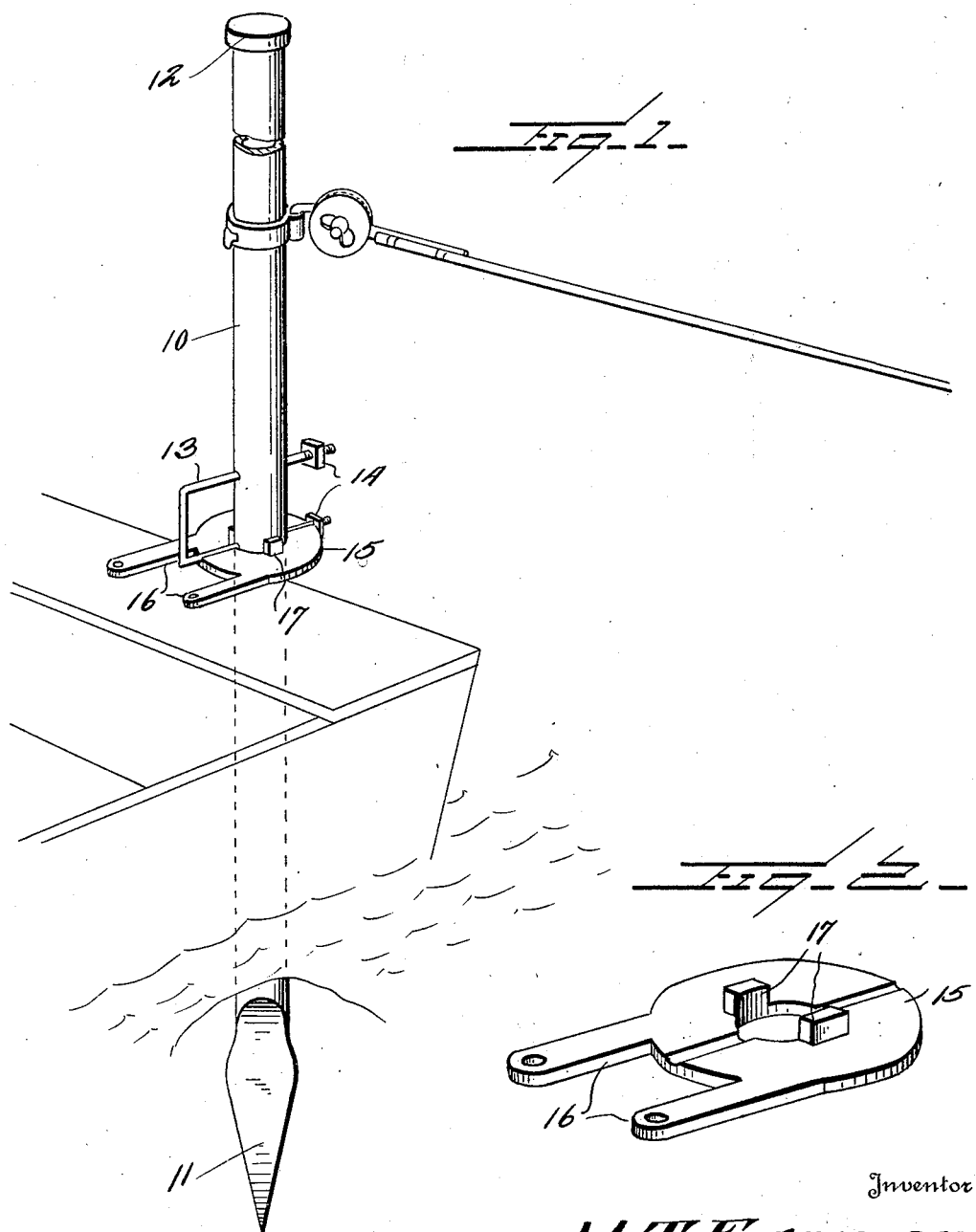

1,716,220

UNITED STATES PATENT OFFICE.

WILLIAM T. FERGUSON, OF BIRDS, ILLINOIS, ASSIGNOR OF ONE-HALF TO OMER LEWIS CUNNINGHAM, OF LAWRENCEVILLE, ILLINOIS.

POST FOR SUPPORTING FISHING RODS.

Original application filed August 24, 1926, Serial No. 131,278. Divided and this application filed February 24, 1927. Serial No. 170,597.

This invention relates to devices for supporting fishing rods and particularly to a device as illustrated in my pending application for Patent Serial No. 131,278, filed August 24, 1926, of which application this is a division.

The general object of the present invention is to provide a fishing rod support consisting of a post or equivalent member preferably pointed at its lower end whereby it may be driven into the ground and provide a plate-like member mounted upon the post and so constructed that it may act to limit the extent to which the post may be forced into the ground and act under these circumstances as a base for the support of the post in soft ground, or may be used as a means for attaching the post upon the deck of a boat.

My invention is illustrated in the accompanying drawings wherein:—

Figure 1 is a perspective view of my improved fishing rod support;

Figure 2 is a perspective view of the supporting plate for the post or stake.

Referring to these drawings 10 designates a metallic pipe constituting the post, whose lower portion is flattened and pointed as at 11, so that it may be driven into the ground. The upper end of the pipe is closed by a screw-cap 12 so formed as to permit the post to receive the impact of a sledge hammer, in case of driving into the ground, without injury to the post.

Extending diametrically through the hollow post are the arms of an approximately U-shaped handle 13. These arms at their free ends beyond the pipe are screw-threaded for the reception of nuts 14 and this permits the extremities of these arms to be passed through a vertically disposed plank and be bolted thereto. Thus, the pipe may be supported upon the skirting planks of a wharf or other structure and the pipe or post held from any twisting movement. This member 13 constitutes a handle whereby the post may be held while being driven, or whereby the post may be lifted and then dropped so that the pointed end may be forced into soft ground to the extent sufficient to permit the post to be driven.

Disposed below the handle is a disk or plate 15, this plate having oppositely disposed, parallel, tangentially projecting arms 16 which are perforated for the passage of screws so that these arms may be raised flat upon the thwart of a boat or the string-piece of a wharf and be attached thereto by screws passing through these perforations. If the disk is attached to a boat, as shown in Figure 1, the post will be supported beyond the stern or side of the boat. The disk 15 is also formed with opposed shoulders 17 which extend upward and fit against the pipe or post and keep it from tilting with reference to the relatively thin plate. The upper face of the disk 15 has two grooves disposed on opposite sides of the central aperture through which the post passes within which the lower arm of the handle 13 rests to keep the post from turning or twisting axially.

The post is provided with means for supporting fishing rods and as far as this application is concerned, any suitable means may be provided for the purpose. Preferably, however, I use the means shown in my pending application for patent before referred to. Inasmuch as this means is fully described in my pending application, I do not believe there is any necessity of describing it in the present application.

It will be seen that by using a post 10 of the character stated, a plurality of rods may be supported in various angular positions so that lines may be cast in any desired direction. The disk 15 constitutes means whereby the stake or post may be supported upon a boat, wharf, or any horizontal plank, and also means which, when the post is driven into soft and muddy ground will prevent the post from sinking and also hold the post from lateral tipping movement. Furthermore it prevents the upper portion of the post from becoming dirty. The lugs 17 prevent the post from tipping in the central opening of the plate 15 when the post is supported, as shown in Figure 1, and the handle 13 coacting with the plate prevents any turning movement of the post.

I claim:—

1. A support for fishing rods comprising a post, a plate-like member having a central opening through which the post passes and provided with two approximately parallel outstanding arms perforated for the passage of attaching means, the post having a diametrically extending member adapted to engage said plate and the plate having a diametrically extending groove to receive said member.

2. A support for fishing rods comprising a post, a plate-like member having a central opening through which the post passes and provided with two approximately parallel outstanding arms perforated for the passage of attaching means, the post having a diametrically extending member adapted to engage said plate, the plate having outstanding lugs on each side of the central opening to prevent relative tipping movement of the post and plate and the upper face of the plate having a diametrically extending groove into which said transverse member fits.

3. A support for fishing rods comprising a post, a U-shaped member formed to provide two arms disposed diametrically through the post and screw-threaded at their extremities, nuts carried on the screw-threaded extremities of the arms, a plate through which the post passes, the plate having arms apertured for the passage of screws and formed for engagement with the lower arm of said member to prevent turning movement of the post relative to the plate.

In testimony whereof I hereunto affix my signature.

WILLIAM T. FERGUSON.